R. C. WRIGHT.
Car-Axle Box.
No. 2,338. Reissued Aug. 14, 1866.
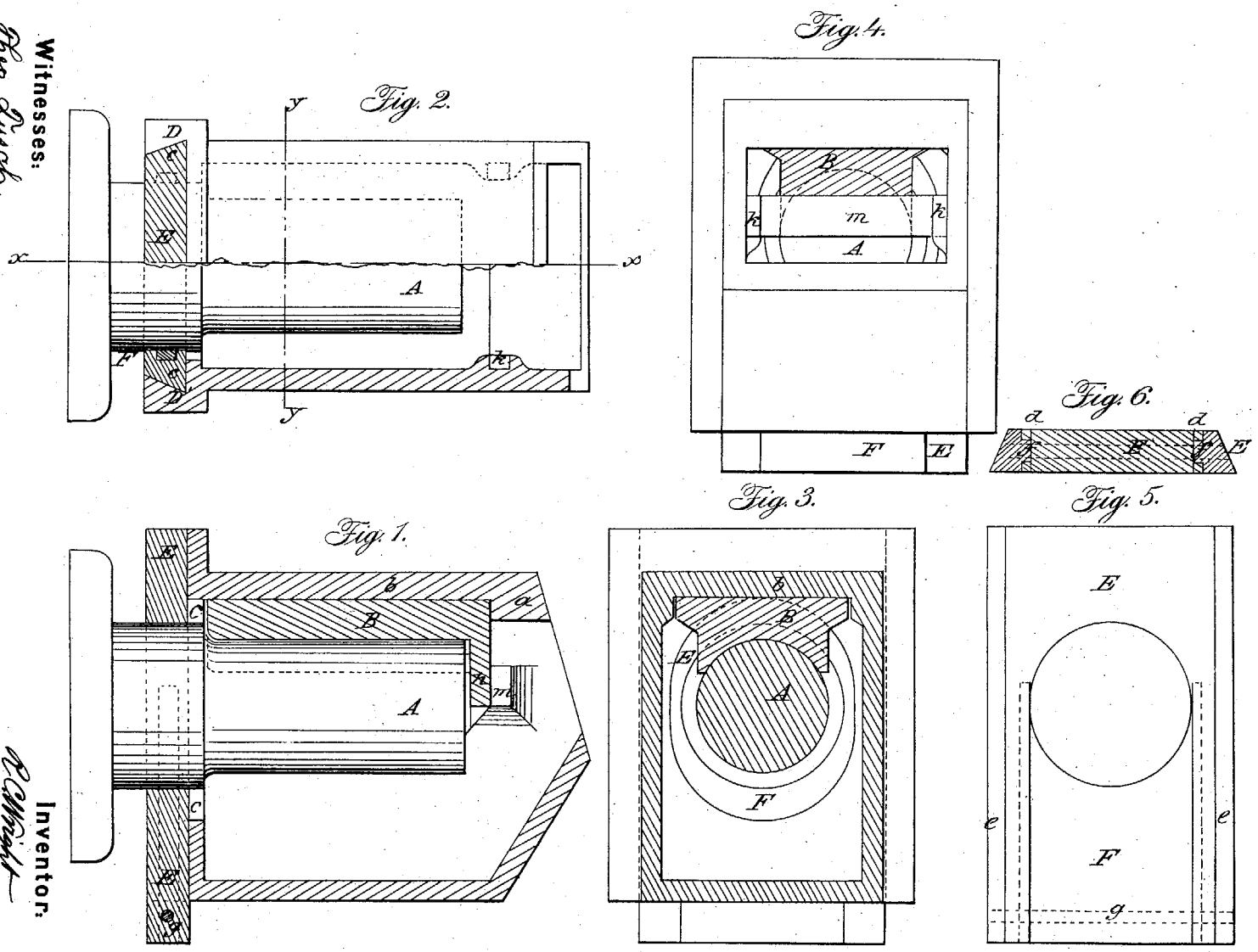
Witnesses:
Theo Dusch
Wm. Irwin
Inventor:
R. C. Wright
By Munn & Co. attys
AM. PHOTO-LITHO. CO. N.Y. (OSBORNE'S PROCESS.)

UNITED STATES PATENT OFFICE.

RANSOM C. WRIGHT, OF MEADVILLE, PENNSYLVANIA.

IMPROVED RAILWAY JOURNAL-BOX.

Specification forming part of Letters Patent No. 50,982, dated November 14, 1865; Reissue No. 2,338, dated August 14, 1866.

*To all whom it may concern:*

Be it known that I, RANSOM C. WRIGHT, of Meadville, in the county of Crawford and State of Pennsylvania, have invented a new and useful Improvement in Railway-Axle Journal-Boxes; and I do hereby declare that the following is a full, clear, and exact description of the same, reference being had to the annexed drawings, made part of this specification, in which—

Figure 1 is a longitudinal vertical section through the center, indicated by the line *x x*, Fig. 2. Fig. 2 is a plan, one-half being shown in section. Fig. 3 is a vertical transverse section on the line *y y*, Fig. 2. Fig. 4 is a front elevation. Fig. 5 is an elevation of the movable back detached. Fig. 6 is a plan of the same.

In the different figures the same letters indicate identical parts.

I will particularly describe the changes I make in the ordinary railway journal-box.

The top of the box is made with a recess (indicated by the letters *a* and *b* in Fig. 1) intended for receiving the top of the bearing B, which is thus held firmly in place, lugs at the corners of the bearing resting against the sides of the recess *b*, preventing lateral motion, while the ends are restrained by the ends of the box, so as to preclude any considerable longitudinal play. The bearing is hollowed out on its under face to fit the journal A of the axle. The longitudinal play of the axle is controlled by the projection *h* on the outer end of the bearing.

The bearing may be introduced without removing the axle by the following means: The opening through the inner face of the journal-box is not made round, but elliptical, as indicated by the exterior lines surrounding the axle A in Fig. 3, leaving spaces *l l* above and below the axle, as shown in Fig. 1. By raising the box until the axle rests upon the lower edge of this elliptical opening, room is given for introducing the bearing through the opening always made in the front or exterior end of the box for lubricating the journal, &c.

The bearing thus inserted over the end of the axle is held in place by the bar *m*, inserted in the grooved lugs K K, in conjunction with the chambered recess *b*, already described. The box and bearing are then let down upon the axle. The space *l* above the axle permits the wearing of the bearing from use without bringing the box and axle into contact. This elliptical opening in the inner face would permit the escape of the oil required in the box for the lubrication of the journal, and also the introduction of dust and sand into the box. To avoid this difficulty the elliptical opening must not be carried to the bevel of the bottom of the box, so that a sufficient chamber may be left to retain the oil not suspended by the waste usually employed for the purpose.

On the inside or back end of the box the projecting flanges D D′, running vertically on both sides of the box, are formed with dovetailed grooves, for the purpose of receiving the dovetailed slide E F. This slide is composed of two neatly-joined pieces, E and F. The piece E includes the half of the axle, and has U-formed projections extending the whole length of the slide, and having the sides *e e* dovetailed to fit the dovetailed grooves already described. The inner faces of these projections have tongues fitting into corresponding rabbets in the edges of the piece F, or vice versa. The piece F thus slides in the piece E, and includes the other half of the axle, as shown in Figs. 5 and 6. The dovetailed flanges being on the outside of the box, the slides may be inserted without removing the axle. They are held together by a rod, *g*, passing through them both, as shown, or by any equivalent device. These slides, forming a movable back for the box, fit snugly against the axle and in the grooves, and prevent the escape of the oil and the entrance of dust or sand.

I do not claim to be the first to fit an adadjustable back to a railway journal-box, so as to prevent the admission of dust, &c., but What I do claim as my invention, and seek to secure by Letters Patent, is—

1. The dovetailed projecting flanges D D′ and dovetailed slide E F, (the slide being composed of two pieces constructed and united as described,) in combination with the rod *g*, for securing the same, the parts being arranged for use substantially in the manner and for the purpose set forth.

2. The bearing B, with its projection *h* and chambered recess *b*, with or without the bar *m*, substantially as and for the purpose set forth.

In testimony whereof I have signed my name to this specification before two subscribing witnesses.

RANSOM C. WRIGHT.

Witnesses:

ALDEN P. STEELE,

J. F. SCHNEEBERGER.